United States Patent
Yokoi

(10) Patent No.: US 8,642,680 B2
(45) Date of Patent: Feb. 4, 2014

(54) ACTIVE RADIATION CURABLE INK COMPOSITION FOR INKJET RECORDING, PRINTED MATTER, METHOD OF MANUFACTURING PRINTED MATTER, MOLDED ARTICLE OF PRINTED MATTER, AND METHOD OF MANUFACTURING MOLDED ARTICLE OF PRINTED MATTER

(75) Inventor: Kazuhiro Yokoi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 150 days.

(21) Appl. No.: 13/072,799

(22) Filed: Mar. 28, 2011

(65) Prior Publication Data

US 2011/0236650 A1   Sep. 29, 2011

(30) Foreign Application Priority Data

Mar. 29, 2010   (JP) ................................ 2010-075723

(51) Int. Cl.
| C09D 11/00 | (2006.01) |
| C08L 45/00 | (2006.01) |
| C08F 257/02 | (2006.01) |
| G01D 11/00 | (2006.01) |
| B41J 2/01 | (2006.01) |

(52) U.S. Cl.
USPC ........... 523/160; 524/532; 524/533; 347/100; 347/102

(58) Field of Classification Search
USPC ........... 523/160; 524/532, 533; 347/100, 102
See application file for complete search history.

(56) References Cited

U.S. PATENT DOCUMENTS

2003/0054103 A1 * 3/2003 Sato et al. ...................... 427/256
2010/0022700 A1   1/2010 Shibatani et al.

FOREIGN PATENT DOCUMENTS

| EP | 1571187 A1 | 9/2005 |
| EP | 1983017 A1 | 10/2008 |
| EP | 2166049 A1 | 3/2010 |
| GB | 1559319 A | 1/1980 |
| JP | 2002-167537 A | 6/2002 |
| JP | 2004-149755 A | 5/2004 |
| JP | 2006-152071 | 6/2006 |
| WO | WO 2009109273 | * 9/2009 ............. H01L 51/52 |

OTHER PUBLICATIONS

Corresponding EPO Official communication.
Partial English language translation of the following: Office action dated Jul. 30, 2013 from the Japanese Patent Office in a Japanese patent application corresponding to the instant patent application. This office action translation is submitted now in order to supplement the understanding of patent document JP 2006-152071 which are cited in the office action and are being disclosed in the instant Information Disclosure Statement.

* cited by examiner

*Primary Examiner* — Alexander Kollias
(74) *Attorney, Agent, or Firm* — SOLARIS Intellectual Property Group, PLLC

(57) ABSTRACT

The present invention provides an active radiation curable ink composition for inkjet recording, the active radiation curable ink composition including: (A) a polymer containing a repeating unit having a radically polymerizable group and having a bicyclo ring structure or a tricyclo ring structure at a site forming a part of a main chain thereof, (B) a photopolymerization initiator, and (C) a radically polymerizable compound having a structure different from that of the (A) radical polymer.

9 Claims, 1 Drawing Sheet

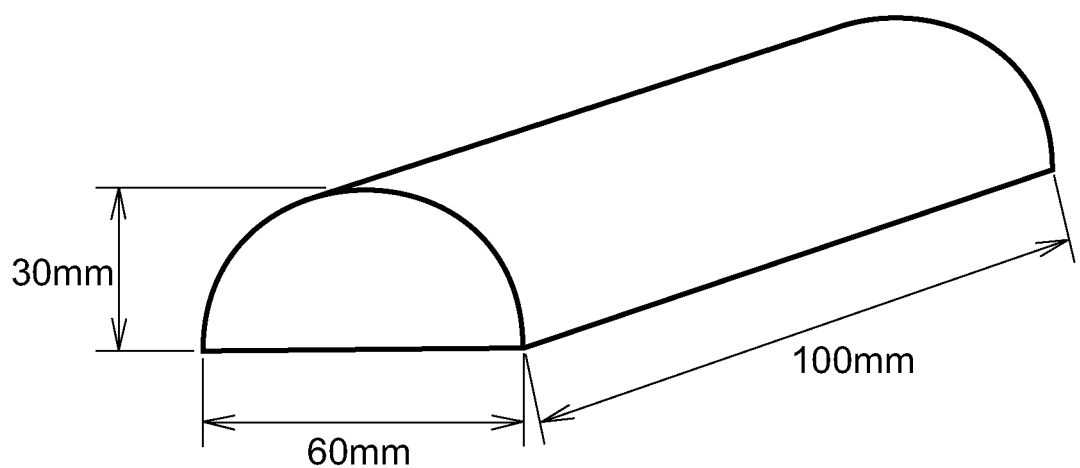

ACTIVE RADIATION CURABLE INK COMPOSITION FOR INKJET RECORDING, PRINTED MATTER, METHOD OF MANUFACTURING PRINTED MATTER, MOLDED ARTICLE OF PRINTED MATTER, AND METHOD OF MANUFACTURING MOLDED ARTICLE OF PRINTED MATTER

CROSS-REFERENCE TO RELATED APPLICATION

This application claims priority under 35 USC 119 from Japanese Patent Application No. 2010-075723 filed on Mar. 29, 2010, the disclosure of which is incorporated by reference herein.

BACKGROUND OF THE INVENTION

The present invention relates to an active radiation curable ink composition for inkjet recording, printed matter, a method of manufacturing printed matter, a molded article of printed matter, and a method of manufacturing a molded article of printed matter.

Various methods such as electrophotographic methods, sublimation-type thermal transfer methods, fusion-type thermal transfer methods, and inkjet methods are known as image recording methods in which images are formed on recording media, such as a paper, according to image data signals. For example, an inkjet method is an excellent image recording method because it can be carried out using inexpensive apparatus, it enables efficient use of ink and lower running costs since an image is directly formed on a recording medium by ejecting ink droplets only onto the region in which the image is to be formed, and it is less noisy.

The ink jetting method enables printing not only on a plain paper, but also non-water-absorbing recording media such as plastic sheets and metal plates. However, high speed printing and high quality images have been issues needed to be addressed, and the time periods required for drying and curing the ink droplets printed by the inkjet method significantly affect, for example, productivity of printed matter, sharpness of a printed image, and the like.

A recording method of using an active radiation curable ink composition for inkjet recording is known as one of ink jetting methods. According to the above recording method, the productivity of a print can be improved and a sharp mage can be formed by exposure to radiation immediately or in a finite period of time after injection of the ink, thereby curing ink droplets.

By increasing radiation sensitivity of the inkjet recording ink which can be cured by irradiation with radiation such as ultraviolet rays, a high curing property against the radiation is imparted to the ink, leading to various advantages such as improvement in productivity of inkjet recording, reduction in electrical consumption, longer life time of a radiation generator due to load reduction thereto, and prevention of evaporation of low-molecular-weight substances which may be caused by insufficient curing. In particular, by increasing the radiation sensitivity of the ink, the strength of an image formed from the inkjet recording ink is increased. However, the long-term storage stability of the ink is easily deteriorated, and it has been difficult to secure ejectionability (ejection property) at the time when the ink stored for a long period of time is ejected by ink-jetting.

In contrast, examples of preferable properties of images formed with ink include adhesiveness with a base material and flexibility of the image. In particular, the flexibility of the image becomes an important factor when the image is formed on the surface of an uneven (not flat) base material or a flexible base material, such or a resin film, or when a molded article of printed matte is manufactured such that a molded article is formed in a state where printing is performed on the surface, such as a resin bottle. However, it has been difficult to achieve a good balance between flexibility and curing properties. More specifically, there is a concern that an increase in the ratio of monofunctional monomers for improving flexibility causes reduction of the curing properties or stickiness of the image surface due to bleeding of uncured low molecular weight ingredients.

In order to improve adhesiveness, flexibility, and curing property, a technique in which a low-viscosity urethane acrylate is used in an inkjet ink composition has been suggested (see, for example, Japanese Patent Application Laid-Open (JP-A) No. 2002-167537).

In order to obtain a photopolymerization initiator composition which is cured at high sensitivity and has excellent storage stability, a technique is known in which a polyfunctional thiol compound having a specific structure is used as a component of a photopolymerization initiator composition for a photosensitive composition (see, for example, JP-A No. 2004-149755, or EP 1983017).

The present invention aims to address to the above problems.

More specifically, an object of the invention is to provide an active radiation curable ink composition for an inkjet recording suitable for an inkjet recording that has excellent ejection stability, high curing sensitivity, and further excellent stretchability of an image obtained by curing, a molded article of printed matter by using the active radiation curable ink composition for inkjet recording, and a method of manufacturing the same.

SUMMARY OF THE INVENTION

According to a first aspect of the invention, there is provided an active radiation curable ink composition for an inkjet recording, the active radiation curable ink composition including: (A) a polymer containing a repeating unit having a radically polymerizable group and having a bicyclo ring structure or a tricyclo ring structure at a site forming a part of a main chain thereof, (B) a photopolymerization initiator, and (C) a radically polymerizable compound having a structure different from that of the (A) radical polymer.

BRIEF DESCRIPTION OF THE DRAWINGS

FIG. 1 is an outline perspective view of a wooden pattern that is disposed in a vacuum molding device for a vacuum molding test of printed matter.

DETAILED DESCRIPTION OF THE INVENTION

According to the present invention, the following first aspect to seventh aspect of the invention are provided. However, the present invention is not limited thereto.

<1> An active radiation curable ink composition for inkjet recording, the active radiation curable ink composition including: (A) a polymer containing a repeating unit having a radically polymerizable group and having a bicyclo ring structure or a tricyclo ring structure at a site forming a part of a main chain thereof, (B) a photopolymerization initiator, and (C) a radically polymerizable compound having a structure different from that of the (A) radical polymer.

<2> The active radiation curable ink composition for inkjet recording according to <1> above, in which the tricyclo ring structure is a tetrahydrodicyclopentadiene structure.

<3> The active radiation curable ink composition for inkjet recording according to <1> or <2> above, in which a ratio of monofunctional monomers in the (C) polymerizable compound is 95% by mass or more based on a total amount of the (C) polymerizable compound.

<4> A method of manufacturing a printed matte, the method including:

a process of ejecting the active radiation curable ink composition for an inkjet recording according to any one of <1> to <3> onto a recording medium by ink-jetting, thereby forming an image; and a process of irradiating the formed image with active radiation to cure the ink composition, thereby obtaining printed matter having a cured image on the recording medium.

<5> Printed matter manufactured by the method of manufacturing printed matter according to <4>.

<6> A method of manufacturing a molded article of printed matter, the method including: a process of molding and processing the printed matter according to <5>, thereby obtaining a molded article of printed matter.

<7> A molded article of printed matter manufactured by the method of manufacturing a molded article of printed matter according to <6>.

Details of the action mechanism in the present invention are unknown but are presumed as follows.

Since the (A) polymer containing a repeating unit having a radically polymerizable group and a bicyclo ring structure or a tricyclo ring structure at a site forming a part of a main chain thereof (hereinafter sometimes also referred to as "the specific polymer A") has a polymerizable group, the polymer functions as a polymerizable compound upon exposure to active radiation. Therefore, it is presumed that since sensitivity is improved, a cured film that is a cured ink composition containing the specific polymer A, exhibits excellent surface curing properties. In contrast, the specific polymer A has a bicyclo ring structure or a tricyclo ring structure of a bulky structure in the same molecule. Therefore, it is presumed that, although the specific polymer A has almost the same molecular weight and crosslinking density as those of cured products that are obtained by cross-linking and curing of usual polymerizable compounds having neither bicyclo ring structure nor tricyclo ring structure, the flexibility and stretching properties can be more favorably maintained as compared to the cured products of the usual polymerizable compounds. Therefore, the printed matter obtained by the ink composition of the invention has excellent properties of molding process.

The use of the specific polymer A allows an increase in the proportion of the (C) radically polymerizable compound (hereinafter sometimes also referred to as "the polymerizable compound C") having a structure different from that of the (A) radical polymer in the ink composition. Therefore, the viscosity of the ink composition containing the specific polymer A can be reduced, and thus the ink composition is considered to be favorable also for an inkjet recording. In particular, by using the polymerizable compound C in a proportion of 95% by mass or more based on a total amount of the monofunctional monomer (preferably a low molecular weight monomer), the viscosity of the ink composition can be further reduced.

The invention can provide an active radiation curable ink composition for inkjet recording suitable for inkjet recording that has excellent ejection stability, high curing sensitivity, and imparts excellent stretchability (stretching property) of images obtained by curing; a molded article of printed matter obtained by using the active radiation curable ink composition for inkjet recording; and a method of manufacturing the same.

The active radiation curable ink composition for inkjet recording of the invention (hereinafter sometimes simply referred to simply as "the ink composition") contains: (A) a polymer containing a repeating unit having a radically polymerizable group and having a bicyclo ring structure or a tricyclo ring structure at a site forming a part of a main chain thereof (specific polymer A), (B) a photopolymerization initiator, and (C) a radically polymerizable compound having a structure different from that of the (A) radical polymer.

Hereinafter, each ingredient for use in the active radiation curable ink composition for inkjet recording of the invention will be described in detail.

(A) Polymer Containing a Repeating Unit Having a Radically Polymerizable Group and Having a Bicyclo Ring Structure or a Tricyclo Ring Structure at a Site Forming a Part of a Main Chain Thereof (=Specific Polymer A)

The specific polymer A used in the invention is a polymer containing a specific repeating unit, and the specific repeating unit has a bicyclo ring structure or a tricyclo ring structure and a radically polymerizable group. The bicyclo ring structure or the tricyclo ring structure is positioned at the main chain of the specific polymer A.

Bicyclo Ring Structure and Tricyclo Ring Structure

The specific polymer A contains a repeating unit having a bicyclo ring structure or a tricyclo ring structure in the site of constituting the main chain of the polymer.

Since the bicyclo ring structure or the tricyclo ring structure is contained in the site of constituting the main chain of the polymer in the repeating unit, a bicyclo ring structure or a tricyclo ring structure of a bulky structure is contained as the main chain of the specific polymer A. Therefore, it is presumed that the crosslinking density is reduced and the flexibility and stretching properties can be maintained as described above. Furthermore, since change of contact angle, when added, is relatively small as compared to common surfactants, it is presumed that when a cured film of the ink composition is covered with an overcoat layer or a protection layer such as a laminate, the adhesion properties with the overcoat layer can be increased.

The tricyclo ring structure in the invention refers to a structure having a ring in which the number of cleavage of a ring interatomic bond required for opening the ring to form a chain structure is 3 times. The bicyclo ring structure in the invention refers to a structure having a ring in which the number of cleavage of a ring interatomic bond required for opening the ring to form a chain structure is twice.

Both the bicyclo ring structure and the tricyclo ring structure are not limited in the type and number of atoms forming the ring in the structure but a ring containing at least one oxygen atom, nitrogen atom, or carbon atom is preferable and a ring containing at least one carbon atom is more preferable. The number of the carbon atoms forming the ring structure is preferably 6 to 18 and more preferably 7 to 12.

Examples of compounds suitable for introducing the bicyclo ring structure include indene. Examples of compounds suitable for introducing the tricyclo ring structure include dicyclopentadiene.

Specific examples of the bicyclo ring include bicyclo[2.2.1]heptane, 2,2-dimethyl-3-methylene-bicyclo[2.2.1]heptane, 2α,6,6-trimethylbicyclo[3.1.1]heptane, 2,5-norbornadiene, 1,3,3-trimethylbicyclo[2.2.1]heptane-2-one, bicyclo[3.3.1]nonane-9-one, 2-methylene-6,6-dimethylbicyclo[3.1.1]heptane, 2,6,6-trimethylbicyclo[3.1.1]hepta-2-ene, 1,3,3-trimethyl-2-oxabicyclo[2.2.2]octane, 1,7,7-trimethyl-bicyclo[2.2.1]heptane-2-one, 2,7,7-trimethylbicyclo[3.1.1]

hepta-2-ene-6-one, 7,7-dimethyl-2-methylenebicyclo[2.2.1]heptane, 4,7,7-trimethyl-6-oxabicyclo[3.2.1]octa-3-ene, 3,7,7-trimethylbicyclo[4.1.0]hepta-3-ene, 6,6-dimethylbicyclo[3.1.1]heptane, 2,7,7-trimethylbicyclo[2.2.1]hepta-2-ene, 2,5,5-trimethylbicyclo[2.2.1]hepta-2-ene, 1,8,8-trimethyl-3-oxabicyclo[3.2.1]octane-2-one, and 7,7-dimethylbicyclo[2.2.1]heptane. Among the above, from the viewpoint of availability of raw materials, bicyclo[2.2.1]heptane, 2,2-dimethyl-3-methylene-bicyclo[2.2.1]heptane, bicyclo[3.3.1]nonane-9-one, and 7,7-dimethylbicyclo[2.2.1]heptane are preferable.

Specific examples of the tricyclo ring include tetrahydrodicyclopentadiene, tricyclo[5.2.1.02,6]decane, tricyclo[6.2.1.02,7]undeca-4,9-diene-3,6-dione, tricyclo[5.2.1.02,6]decane-8-one, 3,9-dimethyltricyclo[5.2.1.02,6]deca-3,8-diene, 1,2-dimethyltricyclo[3.3.0.02,7]octane-3-one, and tricyclo[6.3.1.02,7]dodeca-2,4,6-triene-10-one. Among the above, from the viewpoint of availability of raw materials, tetrahydrodicyclopentadiene is preferable.

The bicyclo ring and the tricyclo ring each may independently have a substituent.

Examples of substituents that can be introduced include an alkyl group, an alkenyl group, an alkynyl group, an aryl group, an aralkyl group, a hydrogen atom, a halogen atom, a hydroxyl group, and a mercapto group. Among the above, an alkyl group and an aryl group are preferable, an alkyl group is more preferable, and an alkyl group having 1 to 3 carbon atoms is particularly preferable.

The position of the substituents that can be introduced into the bicyclo ring and the tricyclo ring is not specified.

The bicyclo ring structure has a structure of a divalent group in which two hydrogen atoms are removed from the bicyclo ring. The tricyclo ring structure has a structure of a divalent group in which two hydrogen atoms are removed from the tricyclo ring.

When the substituents are introduced into the bicyclo ring and the tricyclo ring, the bicyclo ring structure has a structure of a divalent group in which two hydrogen atoms in total are removed from any of the bicyclo ring and the substituent and the tricyclo ring structure has a structure of a divalent group in which two hydrogen atoms in total are removed from any of the tricyclo ring and the substituent.

The number of the bicyclo ring structure and the tricyclo ring contained in the repeating unit in the invention may be at least one.

Radically Polymerizable Group

Examples of the radically polymerizable group include a polymerizable group having an ethylenically unsaturated bond that can react with a radical. Examples include unsaturated carboxylic acid ester groups, such as an acrylic acid ester group (an acrylate group), a methacrylic acid ester group (a methacrylate group), an acryl amide group, a methacrylamide group, an itaconic acid ester group, a crotonic acid ester group, an isocrotonic acid ester group, and a maleic acid ester group, a styrene group, a vinyl ether group, an allyl group, and an N-vinyl group.

Among the above, an acrylate group, a methacrylate group, an acryl amide group, a vinyl ether group, and an N-vinyl group are preferable.

The radically polymerizable group is combined with atoms other than monovalent atoms in the bicyclo ring structure or the tricyclo ring structure and may be combined with the bicyclo ring or the tricyclo ring. Alternatively, when the bicyclo ring and the tricyclo ring have a substituent, the radically polymerizable group may be combined with the substituent. For example, when the bicyclo ring has a propyl group as a substituent, the radically polymerizable group is combined with the carbon atom from which one hydrogen atom is removed among the carbon atoms of a propyl group.

The specific polymer A may contain at least one radically polymerizable group in the repeating unit of the specific polymer A. When two or more radically polymerizable groups are contained, the radically polymerizable groups may be the same or different. From the viewpoint of reactivity and synthesis suitability, they are preferably the same.

The specific polymer A may contain only one kind of the specific repeating unit or may contain two or more kinds thereof. The specific polymer A may be a polymer containing only the specific repeating unit, may be a polymer having a repeating unit (copolymerization component) other than the specific repeating unit in order to control the molecular weight or impart functionality, or may have a perfluoro group having 3 to 8 carbon atoms or a dimethyl siloxane group in the polymer molecules for the purpose of adjusting the surface tension.

In the case where the specific polymer A is a copolymer having a repeating unit (copolymerization component) other than the specific repeating unit, the content ratio of the repeating unit serving as the copolymerization component is preferably from more than 0% by mol to 60% by mol and more preferably from more than 0% by mol to 30% by mol based on the total amount of the specific polymer A.

Examples of the copolymerization component include a repeating unit in which two hydrogen atoms are removed from benzene-based aromatic compounds, such as benzene, toluene, and xylene, a repeating unit in which two hydrogen atoms are removed from aromatic alcohol compounds, such as phenol, hydroquinone, catechol, resorcinol, cresol, and naphthol, and a repeating unit in which two hydrogen atoms are removed from hydrocarbon dienes, such as ethylene and propylene, and a repeating unit in which two hydrogen atoms are removed from aliphatic unsaturated alcohols, such as allyl alcohol, propargyl alcohol, indanol, and indandiol.

The specific polymer A having the bicyclo ring structure can be synthesized according to a method described in JP-A No. 4-300916. The specific polymer A having the tricyclo ring structure can be synthesized according to a method described in JP-A No. 63-99224.

Compounds having a desired copolymerization component can be synthesized according to a synthetic method described in U.S. Pat. No. 4,390,680.

The main chain and a side chain polymerizable group are not particularly limited insofar as they are connected by a covalent bond. A divalent linking group having 1 to 20 carbon atoms that may have a substituent is a preferable linking group. Examples of preferable substituents include an ether group, an ester group, a thioether group, a thioester group, an amide group, a urea group, a hydroxy group, and a halogen atom.

Specific examples (a-1) to (a-16) of the specific polymer A that are preferable in the invention are shown below. However, the invention is not limited to these exemplified compounds.

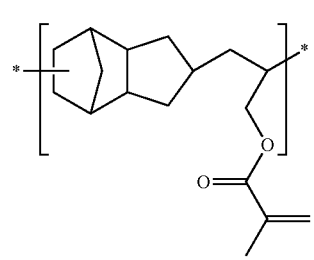

a-1

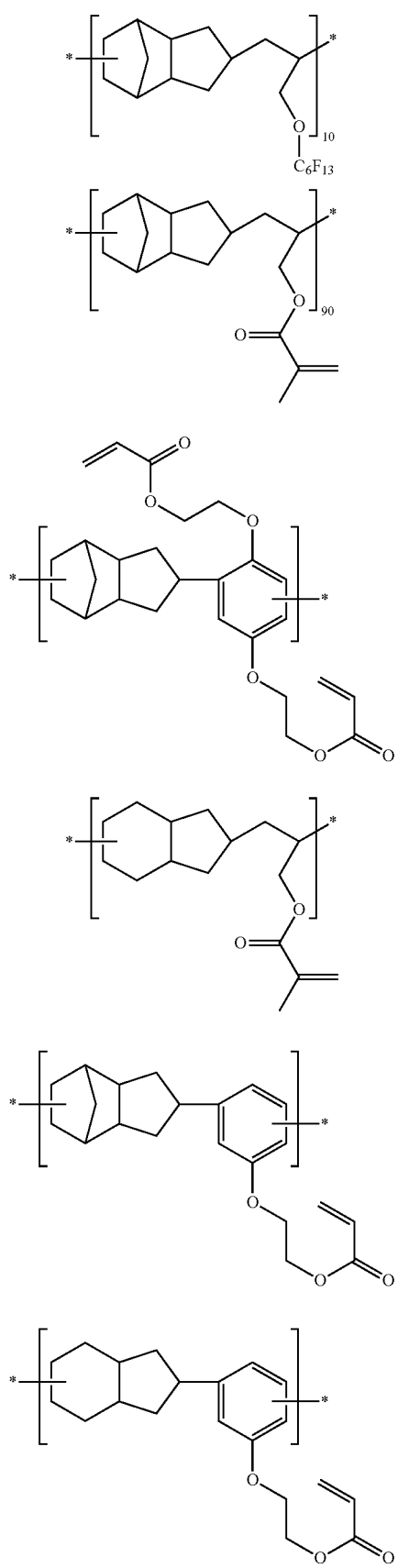
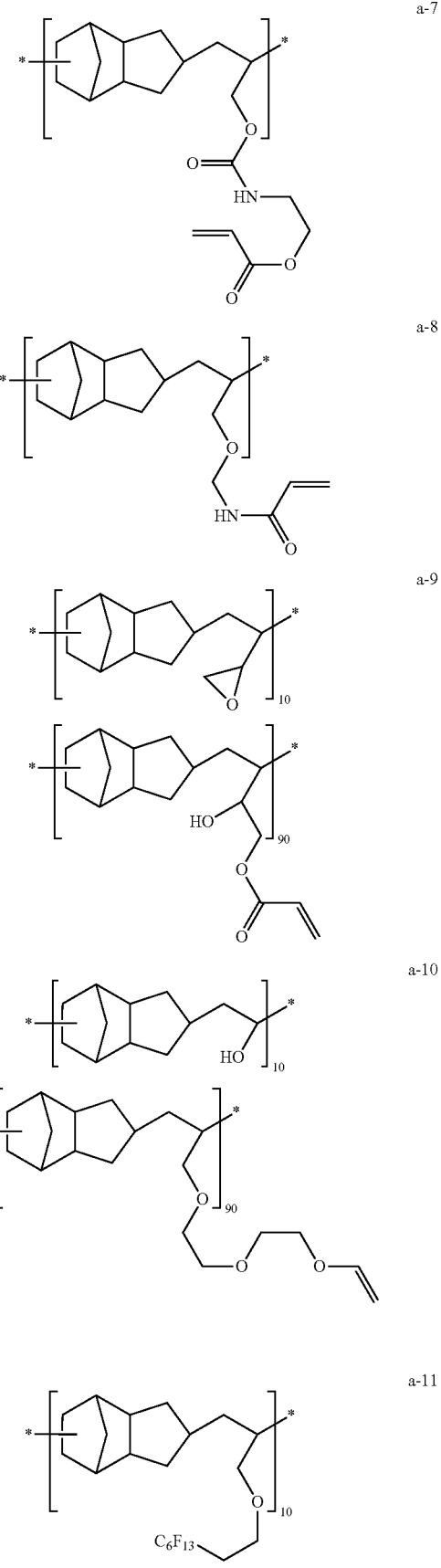

-continued

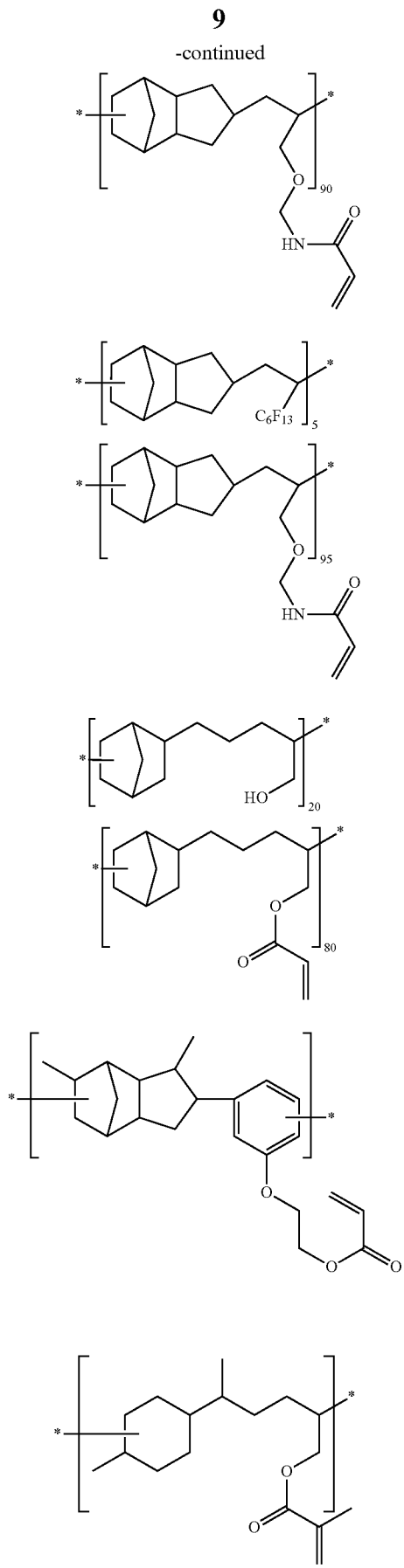

a-12 a-13 a-14 a-15

-continued

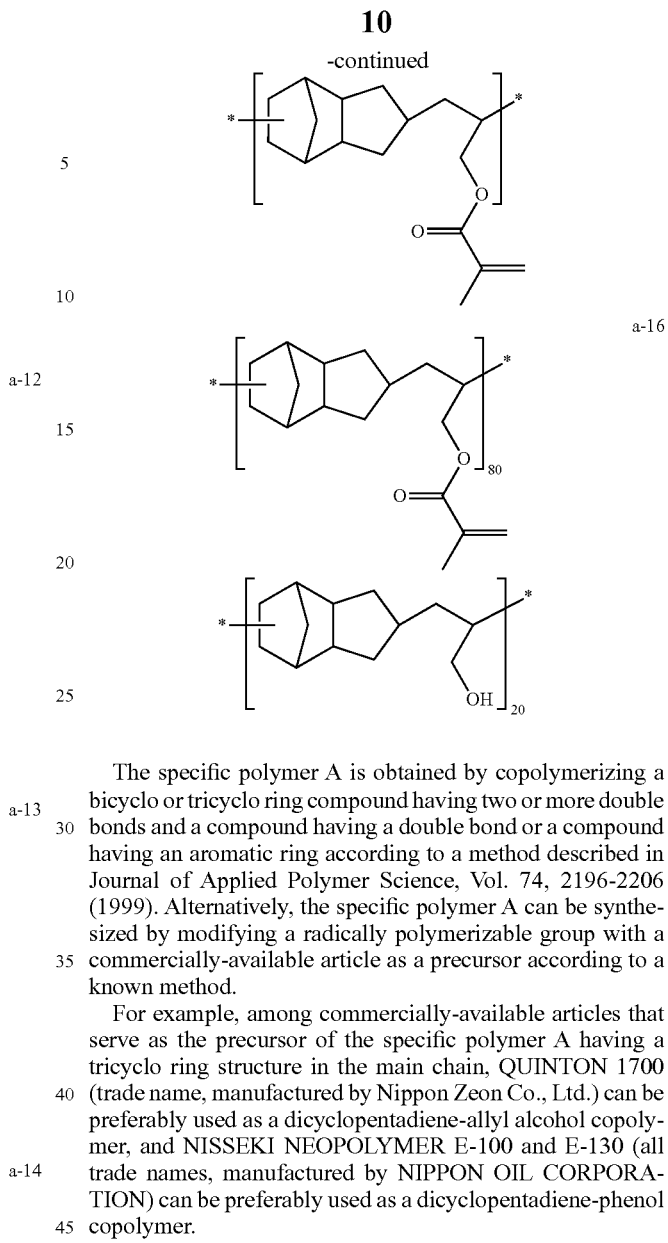

a-16

The specific polymer A is obtained by copolymerizing a bicyclo or tricyclo ring compound having two or more double bonds and a compound having a double bond or a compound having an aromatic ring according to a method described in Journal of Applied Polymer Science, Vol. 74, 2196-2206 (1999). Alternatively, the specific polymer A can be synthesized by modifying a radically polymerizable group with a commercially-available article as a precursor according to a known method.

For example, among commercially-available articles that serve as the precursor of the specific polymer A having a tricyclo ring structure in the main chain, QUINTON 1700 (trade name, manufactured by Nippon Zeon Co., Ltd.) can be preferably used as a dicyclopentadiene-allyl alcohol copolymer, and NISSEKI NEOPOLYMER E-100 and E-130 (all trade names, manufactured by NIPPON OIL CORPORATION) can be preferably used as a dicyclopentadiene-phenol copolymer.

A weight average molecular weight (Mw) of the specific polymer A is preferably from 250 to 10,000, more preferably from 300 to 5,000, and still more preferably from 350 to 3,000.

A content of the specific polymer A in the ink composition of the invention is preferably from 1 to 20% by mass, more preferably from 1 to 15% by mass, and still more preferably from 1 to 10% by mass based on a total amount of the ink composition.

When the content is in this range, the solubility with respect to the ink composition is favorable and the stretching properties of the obtained printed matter are excellent.

(C) Radically Polymerizable Compound (=Polymerizable Compound C) Having a Structure Different from that of the (A) Radical Polymer The ink composition of the invention contains (C) a radically polymerizable compound (=polymerizable compound C) having a structure different from that of the specific polymer A.

Examples of the radically polymerizable compound C which can be used in the invention include a compound having a radically polymerizable ethylenically unsaturated bond.

More specifically, any compound may be used insofar as the compound has a structure different from that of the specific polymer A and has at least one a radically polymerizable ethylenically unsaturated bond in a molecule. Examples include one having a chemical form such as a monomer, an oligomer, or a polymer. Only one kind of the radically polymerizable compound may be used or two or more kinds thereof may be combined at an arbitrary ratio in order to improve intended properties. It is preferable to use two or more kinds of radically polymerizable compounds in combination in terms of controlling the performance such as reactivity and physical properties.

Examples of the polymerizable compound having a radically polymerizable ethylenically unsaturated bond include radically polymerizable compounds such as unsaturated carboxylic acid, such as acrylic acid, methacrylic acid, itaconic acid, crotonic acid, isocrotonic acid, or maleic acid, and salts thereof, anhydrides having an ethylenically unsaturated bond, acrylonitrile, styrene, and various kinds of unsaturated polyester, unsaturated polyether, unsaturated polyamide, and unsaturated urethane.

Specific examples include acrylic acid derivatives, such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate, bis(4-acryloxy polyethoxy phenyl)propane, polyethylene glycol diacrylate, polypropylene glycol diacrylate, dipentaerythritol tetraacrylate, trimethylolpropane triacrylate, oligo ester acrylate, N-methylol acryl amide, diacetone acryl amide, epoxy acrylate, isobornyl acrylate, dicyclopentenyl acrylate, dicyclopentenyloxyethyl acrylate, and dicyclopentanyl acrylate; methacryl derivatives, such as methyl methacrylate, n-butyl methacrylate, allyl methacrylate, glycidyl methacrylate, benzyl methacrylate, dimethylamino methyl methacrylate, polyethylene glycol dimethacrylate, polypropylene glycol dimethacrylate, and 2,2-bis(4-methacryloxy polyethoxy phenyl)propane; and derivatives of allyl compounds, such as allyl glycidyl ether, diallyl phthalate, and triallyl trimellitate. More specifically, commercially-available products described in the "Crosslinking Agent Handbook" edited by Shinzo Yamashita (1981, TAISEISHA), the "UV or EB Curing Handbook (Raw Material Book)" edited by Kiyoshi Kato (1985, Kobunshi Kankokai), "Applications and Markets for UV or EB Curing Technology" (p. 79) edited by RadTech Japan (1989, CMC), the "Polyester Resin Handbook" by Eiichiro Takiyama (1988, Nikkankogyo Shimbun), and the like or radically polymerizable or crosslinking monomers, oligomers, or polymers known in this industry can be used.

Among the acrylates and methacrylates, acrylates of an alcohol having an ether oxygen atom, such as tetrahydrofurfuryl acrylate and 2-phenoxyethyl acrylate are preferable from the viewpoint of the curing properties and the physical properties of the cured film. Furthermore, for the same reason, acrylates of an alcohol having an aliphatic ring structure are also preferable, and specific examples of preferable one include acrylates having a bicyclo or tricyclo ring structure, such as isobornyl acrylate, dicyclopentenyl acrylate, dicyclopentenyloxyethyl acrylate, and dicyclopentanyl acrylate. Among the above, dicyclopentenyl acrylate and dicyclopentenyloxy ethylacrylate having a double bond in the aliphatic ring structure are particularly preferable.

Furthermore, photocurable polymerizable compounds that are used in photopolymerizable compositions described in, for example, JP-A No. 7-159983, Japanese Examined Patent Application Publication (JP-B) No. 7-31399, JP-A Nos. 8-224982, 10-863, and 9-134011, and Japanese Patent National phase Application Publication No. 2004-514014 are known as the radical polymerizable compounds, and they can also be used in the ink composition of the invention.

As other polymerizable compounds, (meth)acrylic acid esters of a (meth)acrylic monomer or prepolymer, an epoxy monomer or prepolymer, or a urethane monomer or prepolymer (hereinafter referred to as "an acrylate compound" as appropriate) may be used.

More specifically, examples of the other polymerizable compounds include 2-ethylhexyl-diglycol acrylate, 2-hydroxy-3-phenoxypropyl acrylate, 2-hydroxybutyl acrylate, hydroxypivalic acid neopentylglycol diacrylate, 2-acryloyloxyethylphthalic acid, methoxy-polyethylene glycol acrylate, tetramethylolmethane triacrylate, 2-acryloyloxyethyl-2-hydroxyethylphthalic acid, dimethyloltricyclodecane diacrylate, ethoxylated phenyl acrylate, 2-acryloyloxyethyl-succinic acid, nonylphenol EO adduct acrylate, modified glycerine triacrylate, bisphenol A diglycidyl ether acrylic acid adduct, modified bisphenol A diacrylate, phenoxy-polyethylene glycol acrylate, 2-acryloyloxyethyl hexahydrophthalic acid, bisphenol A PO adduct diacrylate, bisphenol A EO adduct diacrylate, dipentaerythritol hexaacrylate, pentaerythritol triacrylate tolylene diisocyanate urethane prepolymer, lactone-modified flexible acrylate, butoxyethyl acrylate, propylene glycol diglycidyl ether acrylic acid adduct, pentaerythritol triacrylate hexamethylene diisocyanate urethane prepolymer, 2-hydroxyethyl acrylate, methoxydipropylene glycol acrylate, ditrimethylolpropane tetraacrylate, pentaerythritol triacrylate hexamethylene diisocyanate urethane prepolymer, stearyl acrylate, isoamyl acrylate, isomyristyl acrylate, isostearyl acrylate, and lectone-modified acrylate.

These acrylate compounds are preferable as polymerizable compounds that have been used in UV-curable inks since they have less skin irritation and less sensitization (less causing rash), and they exhibit a relatively low viscosity, so that stable ejection properties of the an ink are obtained, and the polymerization sensitivity and the adhesiveness with recording media are favorable.

The monomers mentioned as other polymerizable compounds have low sensitizing properties, high reactivity, a low viscosity, and favorable adhesiveness with recording media, even though they have a low molecular weight.

The radically polymerizable compounds may have an embodiment in which at least three kinds of polymerizable compounds of each of a monofunctional monomer, a bifunctional monomer, and a tri- or higher-functional monomer are used in combination. The use of at least three kinds of polymerizable compounds enables to further improve the sensitivity, bleeding, and adhesiveness with recording media, while maintaining safety.

Examples of the monofunctional monomer include monoacrylate.

The monoacrylate is preferably stearyl acrylate, isoamyl acrylate, isomyristyl acrylate, or isostearyl acrylate in terms of high sensitivity, low contractility, prevention of curling, prevention of bleeding, and reduced odor of printed matters and cost reduction of the irradiation device.

As an oligomer that can be used in combination with the monoacrylate is particularly preferably an epoxy acrylate oligomer or a urethane acrylate oligomer.

Methacrylates have less skin irritation than acrylates.

The proportion of the monofunctional monomer is preferably 95% by mass or more and more preferably 98% by mass or more based on a total amount of the radically polymerizable compound C. By adjusting the ratio of the monofunctional monomer in the radically polymerizable compound C to the above-described proportion, the crosslinking density, when the polymerizable compound in the ink composition is brought into crosslinking curing reaction, can be reduced and flexibility and stretching properties of the cured film of the ink composition can be improved.

From the viewpoint of the curing rate, flexibility after curing, and the adhesiveness with recording target media, the radically polymerizable compound is also preferably a compound having a nitrogen atom and a polymerizable unsaturated bond in a molecule or also preferably a compound selected from (meth)acrylate having a nitrogen atom, acrylamide, or N-vinyl lactam.

Cationically Polymerizable Compound

The active radiation curable ink composition for inkjet recording of the invention may further contain a cationically polymerizable compound insofar as it does not impair effects of the invention. The cationically polymerizable compound is not particularly limited insofar as the compound causes a polymerization reaction by acid generated from a photoacid generator and cures. Various known cationic polymerizable monomers known as a photo-cationically polymerizable compound can be used. Examples of the cationically polymerizable compounds include epoxy compounds, vinyl ether compounds, and oxetane compounds described in JP-A Nos. 6-9714, 2001-31892, 2001-40068, 2001-55507, 2001-310938, 2001-310937, 2001-220526, etc.

A total content of the polymerizable compound including the specific polymer A based on a total solid content of the active radiation curable ink composition for inkjet recording of the invention is preferably from 50% by mass to 95% by mass, more preferably from 60% by mass to 90% by mass, and still more preferably from 70% by mass to 90% by mass. By adjusting to the content in the range mentioned above, a coating film having favorable curing properties and flexibility is obtained.

(B) Photopolymerization Initiator

The ink composition of the invention contains the (B) photopolymerization initiator.

As the (B) photopolymerization initiator, known photopolymerization initiators can be appropriately selected to use them according to the kind of the specific polymer A and polymerizable compound C and the intended use of the ink composition.

The photopolymerization initiator used in the ink composition of the invention is a compound that absorbs external energy (light) to generate a radical which is a polymerization initiation species. Examples of the light include active radiation, i.e., $\gamma$-rays, $\beta$-rays, electron beams, ultraviolet rays, visible rays, and infrared rays.

Any of known compounds may be used as the additional photopolymerization initiator. Examples of photopolymerization initiators that are preferably used in the invention include: (a) aromatic ketones; (b) acyl phosphine oxide compounds; (c) aromatic onium salt compounds; (d) organic peroxides; (e) thio compounds; (f) hexaaryl biimidazole compounds; (g) ketooxime ester compounds; (h) borate compounds; (i) azinium compounds; (j) metallocene compounds; (k) active ester compounds; (l) compounds having a carbon-halogen bond; and (m) alkylamine compounds.

As the photopolymerization initiators, the above compounds of (a) to (m) may be used singly or in combination. The photopolymerization initiator in the invention is preferably used singly or in combination of two or more kinds thereof.

Preferable examples of the (a) aromatic ketones, the (b) acylphosphine compounds, and the (e) thio compounds include compounds having a benzophenone skeleton or a thioxanthone skeleton described in "RADIATION CURING IN POLYMER SCIENCE AND TECHNOLOGY" J. P. FOUASSIER, J. F. RABEK (1993), pp. 77 to 117. Examples of more preferable one include an $\alpha$-thiobenzophenone compound described in JP-B No. 47-6416, a benzoin ether compound described in JP-B No. 47-3981, an $\alpha$-substituted benzoin compound described in JP-B No. 47-22326, a benzoin derivative described in JP-B No. 47-23664, aroylphosphonic acid ester described in JP-A No. 57-30704, dialkoxybenzophenone described in JP-B No. 60-26483, benzoin ethers described in JP-B No. 60-26403 and JP-A No. 62-81345, $\alpha$-aminobenzophenones described in JP-B No. 1-34242, U.S. Pat. No. 4,318,791, and EP Patent No. 0284561A1, p-di(dimethylamino benzoyl)benzene described in JP-A No. 2-211452, thio-substituted aromatic ketones described in JP-A No. 61-194062, acylphosphine sulfide described in JP-B No. 2-9597, acylphosphine described in JP-B No. 2-9596, thioxanthones described in JP-B No. 63-61950, and coumarin compounds described in JP-B No. 59-42864.

In addition to the above, polymerization initiators described in JP-A Nos. 2008-105379 and 2009-114290 are also preferable.

Among the above, it is preferable to use an acylphosphine oxide compound as the photopolymerization initiator in the invention. Preferable examples include bis(2,4,6-trimethylbenzoyl)-phenyl phosphine oxide (IRGACURE 819: trade name, manufactured by Ciba Specialty Chemicals, Inc.), bis(2,6-dimethoxybenzoyl)-2,4,4-trimethylpentyl-phosphine oxide, and 2,4,6-trimethyl benzoyl-diphenyl phosphine oxide (DAROCUR TPO: trade name, manufactured by Ciba Specialty Chemicals, Inc., Lucirin TPO: trade name, manufactured by BASF A.G.).

The photopolymerization initiators can be used singly or in combination of two or more kinds thereof.

The content of the photopolymerization initiator in the ink composition is preferably from 0.1 to 20% by mass, more preferably from 0.5 to 15% by mass, and still more preferably from 1 to 10% by mass relative to the ink composition.

Other Ingredients

To the ink composition of the invention, ingredients other than the above can be further added. The ingredients will be described one by one below.

Colorant

The ink composition of the invention may further include a colorant in accordance with the purpose. When the ink composition contains a colorant, an ink composition with which a visible image (color image) can be formed is obtained.

The colorant that can be used in the ink composition is not particularly limited, and any one of various known colorants (including pigments and dyes) may be selected and used in depending on the application. For example, for forming an image having excellent weather resistance, a pigment is preferably used. Regarding the dyes, either a water-soluble dye or an oil-soluble dye may be used, but an oil-soluble dye is preferable.

Pigment

First, description is given to a pigment which is preferably used as the colorant in the ink composition. When a pigment is used as the colorant, excellent light fastness can be imparted to a color image formed using the ink composition.

The pigment is not particularly limited, and any one of commercially-available organic pigments and inorganic pigments, a dispersion of dispersing a pigment in an insoluble resin or the like as a dispersing medium, a pigment having a surface on which a resin is grafted, and the like may be used. Alternatively, a resin particle colored with a dye may be used.

Examples of the pigment include pigments disclosed in, for example, Seijiro Ito, "Ganryo no Jiten" (2000); W. Herbst, K.

Hunger "Industrial Organic Pigments"; JP-A Nos. 2002-12607, 2002-188025, 2003-26978, and 2003-342503.

Specific examples of the organic pigments and inorganic pigment which may be used in the invention include compounds disclosed in paragraphs [0126] to [0131] of JP-A No. 2008-13646, and any one of the compounds may be used in the invention.

The pigment may be dispersed using, for example, a dispersion apparatus such as a ball mill, a sand mill, an attritor, a roll mill, a jet mill, a homogenizer, a paint shaker, a kneader, an agitator, a HENSCHEL mixer, a colloid mill, an ultrasonic homogenizer, a pearl mill, or a wet-type jet mill.

A dispersant may be added when the pigment is dispersed. Examples of the dispersant include hydroxyl group-containing carboxylic acid esters, salts of long-chain polyaminoamides and high-molecular-weight acid esters, salts of high-molecular-weight polycarboxylic acids, high-molecular-weight unsaturated acid esters, high-molecular-weight copolymers, modified polyacrylates, aliphatic polyvalent carboxylic acids, naphthalenesulfonic acid/formalin condensates, polyoxyethylene alkyl phosphates, and pigment derivatives. It may be preferable to use a commercially-available polymer dispersant such as SOLSPERSE series available from The Lubrizol Corporation.

As a dispersion aid, a synergist may be used depending on the various pigments. It is preferable that the dispersant and the dispersion aid be added in an amount of from 1 to 50 parts by mass with respect to 100 parts by mass of the pigment.

In the ink composition, a solvent may be added as a dispersion medium for dispersing various components such as the pigment. Alternatively, the polymerizable compound which is a low-molecular-weight component may be used as a dispersion medium in the absence of a solvent. However, since the ink composition of the invention is a radiation-curable ink and the ink is cured after being applied onto a recording medium, it is preferable that no solvent be used. The reason thereof is that, if a solvent is left in an image formed by the cured ink, the solvent resistance may be deteriorated, and problems caused by the volatile organic compound (VOC) included in the remaining solvent may arise. In this regard, it is preferable to use a polymerizable compound as a dispersant, and is particularly preferable to use a polymerizable compound selected from cation-polymerizable monomers having the lowest viscosities, from the viewpoints of dispersion suitability and improvement in handling property of the ink composition.

A volume-average particle diameter of pigment particles in the ink composition is preferably from 0.02 μm to 0.60 μm, and more preferably from 0.02 μm to 0.10 μm. The maximum particle diameter is preferably 3 μm or less, and more preferably 1 μm or less, and the pigment, dispersant, and dispersion medium, the dispersion conditions, and the filtration conditions are appropriately selected so that the particle diameter falls within the above ranges. By controlling the particle diameter, clogging of a head nozzle can be suppressed, and favorable ink storage stability, ink clarity, and curing sensitivity can be attained.

Dye

Next, description is given to a dye which may be preferably used as the colorant to be used in the invention.

Any dye that is appropriately selected from conventionally known dyes may be used. Specific examples thereof include compounds as disclosed in paragraphs [0023] to [0089] of JP-A No. 2002-114930 and paragraphs [0136] to [0140] of JP-A No. 2008-13646, and any one of the compounds may be used in the invention.

The colorant is added to the ink composition in an amount of preferably from 0.05 to 20% by mass, and more preferably from 0.2 to 10% by mass, with respect to the total mass of the ink composition. When an oil-soluble dye is used as the colorant, the amount of the oil-soluble dye is preferably from 0.2 to 6% by mass with respect to a total amount (including the solvent) of the ink composition.

Sensitizing Dye

In order to promote decomposition of the photopolymerization initiator by irradiation of active radiation, a sensitizing dye can be added to the ink composition of the invention. The sensitizing dye absorbs a specific active radiation to take an electronically excited state. The sensitizing dye in the electronically excited state contacts the polymerization initiator to cause the action, such as electron transfer, energy transfer, or heat generation, thereby promoting a chemical change of the photopolymerization initiator, i.e., decomposition and generation of radical, acid, or base.

As the sensitizing dye, compounds which are in response to a wavelength of active radiation that causes generation of a polymerization initiation species in the polymerization initiator used in the ink composition may be used. Considering the application for curing reactions of general ink compositions, preferable examples of the sensitizing dye include dyes belonging to the compound groups listed below and having an absorption wavelength in the wavelength range of 350 nm to 450 nm.

Examples include polynuclear aromatic compounds (e.g., anthracene, pyrene, perylene, and triphenylene), thioxanthones (e.g., isopropyl thioxanthone), xanthenes (e.g., fluorescein, eosin, erythrocin, rhodamine B, and rose bengal), cyanines (e.g., thiacarbocyanine and oxacarbocyanine), merocyanines (e.g., merocyanine and carbomerocyanine), thiazines (e.g., thionine, methylene blue, and toluidine blue), acridines (e.g., acridine orange, chloroflavine, and acriflavine), anthraquinones (e.g., anthraquinone), squaryliums (e.g., squarylium), and coumarins (e.g., 7-diethylamino-4-methylcoumarin). Preferable examples include polynuclear aromatic compounds and thioxanthones.

In addition to the above, sensitizing dyes described in JP-A No. 2008-95086 are also preferable.

Co-Sensitizer

The ink composition of the invention may further include a co-sensitizer. In the invention, the co-sensitizer may function to enhance the sensitivity of the sensitizing dye to active radiation, or to suppress polymerization inhibition of the polymerizable compound, which is caused by oxygen.

Examples of the co-sensitizer include amines such as compounds as disclosed in, for example, M. R. Sander et al., "Journal of Polymer Science", vol. 10, p. 3173 (1972), JP-B No. 44-20189, JP-A Nos. 51-82102, 52-134692, 59-138205, 60-84305, 62-18537, and 64-33104, and Research Disclosure vol. 33825, and specific examples include triethanolamine, ethyl p-dimethylaminobenzoate, p-formyldimethylaniline, and p-methylthiodimethylaniline.

Examples of other co-sensitizer include thiols and sulfides, for example, thiol compounds disclosed in JP-A No. 53-702, JP-B No. 55-500806, and JP-A No. 5-142772; and disulfide compounds disclosed in JP-A No. 56-75643. Specifically, 2-mercaptobenzothiazole, 2-mercaptobenzoxazole, 2-mercaptobenzoimidazole, 2-mercapto-4(3)-quinazoline, and β-mercaptonaphthalene are exemplified.

Other examples of the co-sensitizer include amino acid compounds (for example, N-phenylglycine), organic metal compounds disclosed in JP-B No. 48-42965 (for example, tributyltin acetate), hydrogen-donating compounds disclosed in JP-B No. 55-34414, sulfur compounds disclosed in JP-A No. 6-308727 (for example, trithiane), phosphor compounds disclosed in JP-A No. 6-250387 (for example, diethyl phosphite), and Si—H and Ge—H compounds disclosed in JP-A No. 8-65779.

Ultraviolet Absorber

The ink composition of the invention may further include an ultraviolet absorber from the viewpoints of improving weather resistance and preventing discoloration of the obtained image.

Examples of the ultraviolet absorber include: benzotriazole compounds disclosed in, for example, JP-A Nos. 58-185677, 61-190537, 2-782, 5-197075, and 9-34057; benzophenone compounds disclosed in, for example, JP-A Nos. 46-2784 and 5-194483, and U.S. Pat. No. 3,214,463; cinnamic acid compounds disclosed in, for example, JP-B Nos. 48-30492 and 56-21141 and JP-A No. 10-88106; triazine compounds disclosed in, for example, JP-A Nos. 4-298503, 8-53427, 8-239368, 10-182621, and 8-501291; and compounds disclosed in Research Disclosure No. 24239, and compounds that absorb ultraviolet ray and emit fluorescence, that is, so-called fluorescent brighteners, which are typified by stilbene compounds and benzoxazole compounds.

The amount to be added is appropriately selected depending on the purpose, but, in general, is preferably from 0.5 to 15% by mass in terms of solid content.

Antioxidant

The ink composition of the invention may further include an antioxidant for improving stability.

Examples of the antioxidant includes those disclosed, for example, in EP Patent Nos. 223739, 2309401, 309402, 310551, 310552, and 459416, DE Patent No. 3435443, JP-A Nos. 54-48535, 62-262047, 63-113536, 63-163351, 2-262654, 2-71262, 3-121449, 5-61166, and 5-119449, and U.S. Pat. Nos. 4,814,262 and 4,980,275.

The addition amount is appropriately selected depending on purposes, but is preferably from 0.1 to 8% by mass in terms of solid content.

Discoloration Inhibitor

The ink composition of the invention may further include any of various organic or metal complex discoloration inhibitors.

Examples of the organic discoloration inhibitors include hydroquinones, alkoxyphenols, dialkoxyphenols, phenols, anilines, amines, indanes, chromanes, alkoxyanilines, and hetero rings.

Examples of the metal complex discoloration inhibitors include nickel complexes and zinc complexes. Specifically, any of the compounds disclosed in the patent publications cited in Research Disclosure No. 17643, VII-I to VII-J, Research Disclosure No. 15162, Research Disclosure No. 18716, p. 650, left column, Research Disclosure No. 36544, p. 527, Research Disclosure No. 307105, p. 872, and Research Disclosure No. 15162; and the compounds that are fallen within the general formula and exemplary compounds that are the representative compounds, as disclosed in pp. 127-137 of JP-A No. 62-215272, may be used.

The addition amount is appropriately selected depending on purposes, but is preferably from 0.1 to 8% by mass in terms of solid content.

Conductive Salts

The ink composition of the invention may further include a conductive salt such as potassium thiocyanate, lithium nitrate, ammonium thiocyanate, or dimethylamine hydrochloride, for purpose of controlling ejection properties.

Solvent

A minute amount of a non-curable organic solvent may be added to the ink composition of the invention in order to improve adhesiveness between the ink composition and a recording medium (base material).

Examples of the solvent include: ketone solvents such as acetone, methyl ethyl ketone, and diethylketone; alcohol solvents such as methanol, ethanol, 2-propanol, 1-propanol, 1-butanol, and tert-butanol; chlorine-containing solvents such as chloroform and methylene chloride; aromatic solvents such as benzene and toluene; ester solvents such as ethyl acetate, butyl acetate, and isopropyl acetate; ether solvents such as diethyl ether, tetrahydrofuran, and dioxane; and glycol ether solvents such as ethylene glycol monomethyl ether and ethylene glycol dimethyl ether.

It is effective to add a solvent in such an amount such that problems to solvent resistance, VOC, and the like are not caused, and the amount is preferably from 0.1 to 5% by mass, and more preferably from 0.1 to 3% by mass, with respect to the entire ink composition.

Polymer Compound

Any of various polymer compounds may be added to the ink composition of the invention in order to control film properties.

Examples of the polymer compounds include acrylic polymers, polyvinyl butyral resins, polyurethane resins, polyamide resins, polyester resins, epoxy resins, phenol resins, polycarbonate resins, polyvinyl butyral resins, polyvinyl formal resins, shellac, vinyl resins, acrylic resins, rubber resins, waxes, and other natural resins. A combination of two or more of the polymer compounds may be used. In particular, a vinyl copolymer obtained by copolymerization of acrylic monomers is preferable. Furthermore, a copolymer having, as a structural unit, "a carboxyl group-containing monomer", "an alkyl methacrylate" or "an alkyl acrylate" as a copolymerization formulation of a polymer binder is preferably used.

As the polymer compounds, fluorine atom-containing polymer compounds or polymers having a long chain-alkyl group at the side chain, as described, for example, in [0017] to [0037] of JP-A No. 2008-248119, and [0015] to [0034] of JP-A No. 2005-250890, may be used.

Surfactant

The ink composition of the invention may further include a surfactant.

Examples of the surfactant include those disclosed in JP-A Nos. 62-173463 and 62-183457. Specific examples thereof include: anionic surfactants such as dialkyl sulfosuccinates, alkyl naphthalene sulfonates, and aliphatic acid salts; nonionic surfactants such as polyoxyethylene alkyl ethers, polyoxyethylene alkyl allyl ethers, acetylene glycols, and polyoxyethylene/polyoxypropylene block copolymers; and cationic surfactants such as alkylamine salts and quaternary ammonium salts.

Alternatively, an organic fluoro compound may be used instead of the surfactant.

The organic fluoro compound is preferably hydrophobic. Examples of the organic fluoro compound include fluorine-containing surfactants, oily fluorine-containing compounds (for example, fluorinated oil), and solid fluorine-containing resins (for example, tetrafluoroethylene resins), and more specifically, those disclosed in JP-B No. 57-9053 (columns 8-17) and JP-A No. 62-135826.

If needed, any other additives such as a leveling additive, a matting agent, waxes for controlling film properties, or a tackifier, which does not inhibit polymerization, for improving adhesiveness to a recording medium made of polyolefin, PET, or the like, may be added to the ink composition.

Specifically, the tackifier may be a high-molecular-weight adhesive polymer disclosed in pp. 5-6 of JP-A No. 2001-49200 (for example, copolymers obtained from an ester of (meth)acrylic acid and an alcohol having an alkyl group having 1 to 20 carbon atoms, an ester of (meth)acrylic acid and an alicyclic alcohol having 3 to 14 carbon atoms, and an ester of (meth)acrylic acid and an aromatic alcohol having 6 to 14 carbon atoms), or a low-molecular-weight adhesion-imparting resin having a polymerizable unsaturated bond.

Preferable Physical Properties of Ink Composition

When the ink composition is applied to inkjet recording, a viscosity of the ink composition at a temperature in terms of ink ejection (for example, from 40° C. to 80° C., and more preferably from 25° C. to 30° C.) is preferably from 7 to 30 mPa·s, and more preferably from 7 to 20 mPa·s, in view of ejectionability. For example, a viscosity of the ink composition at room temperature (25° C. to 30° C.) is preferably from 35 to 500 mPa·s, and more preferably from 35 to 200 mPa·s.

It is preferable to appropriately control the formulation of the ink composition so that the viscosity thereof falls within the above ranges. Adjustment of the viscosity at room temperature to a higher degree enables to prevent ink penetration into a recording medium even when a porous recording medium is used. As a result, uncured monomer and odor can be reduced. Furthermore, ink bleeding at the time of impact of ink droplets can be suppressed; and as a result, favorably image quality can be improved.

A surface tension of the ink composition is preferably from 20 to 30 mN/m, and more preferably from 23 to 28 mN/m. When recording is carried out on various recording media such as a polyolefin, PET, a coat paper, a non-coat paper, or the like, the surface tension is preferably 20 mN/m or more from the viewpoints of bleeding and penetration, and is preferably 30 mN/m or less from the viewpoint of wettability.

The ink composition is preferably used for ink-jetting. When used in ink-jetting, the recording is carried out in such a manner that the ink composition is ejected onto a recording medium using an inkjet recording apparatus, and the ejected ink composition is then irradiated with radiation to cure the ink composition.

On the printed matter obtained by using the ink composition, an image area is cured by irradiating radiation such as ultraviolet ray, which results in the image area with excellent strength. Therefore, in addition to the image formation with an ink composition, the ink composition may be used for various applications such as formation of an ink-receiving layer (image area) of a planographic printing plate.

Inkjet Recording Method and Printed Matter and Production Method of the Same, and R Molded Article of Printed Matte and Production Method of the Same A preferable inkjet recording method of the invention includes: ejecting the ink composition of the invention onto a recording medium (such as a support or recording material) from an inkjet recording apparatus; and irradiating the ejected ink composition with active radiation to cure the ink composition. The cured ink composition forms an image on the recording medium.

The method for manufacturing a printed matter of the invention is based on the inkjet recording method described above and more specifically include a process of ejecting the ink composition of the invention onto a recording medium by ink jetting to form an image; and a process of irradiating the obtained image with active radiation to cure the ink composition, thereby obtaining a printed matter having a cured image on the recording medium. The printed matter of the invention is manufactured by the method of manufacturing a printed matter described above.

The recording medium (base material) which may be used in the inkjet recording method is not particularly limited, and examples thereof include: paper such as a generally-used non-coated paper and a coated paper; and various non-absorbable resin materials used for soft packing, and resin films formed from the non-absorbable resin materials. Examples of various plastic films include PET films, OPS films, OPP films, ONy films, PVC films, PE films, and TAC films. Furthermore, examples of plastics which may be used as a material of the recording medium include polycarbonate, acrylic resins, ABS, polyacetal, PVA, and rubbers. Alternatively, a recording medium made of a metal or a glass may be used.

The recording medium which may be used in the invention may be a support of a planographic printing plate.

Examples of the active radiation that can be used in the inkjet recording method of the invention include α-ray, γ-ray, X-ray, ultraviolet ray, visible light ray, infrared ray, and electron beam. The peak wavelength of the active radiation is preferably from 200 nm to 600 nm, more preferably from 300 nm to 450 nm, and still more preferably from 350 nm to 420 nm. A power of the active radiation is preferably 2,000 mJ/cm$^2$ or less, more preferably from 10 to 2,000 mJ/cm$^2$, still more preferably from 20 to 1,000 mJ/cm$^2$, and still more preferably from 50 to 800 mJ/cm$^2$.

In the inkjet recording method of the invention, it is particularly preferable that the radiation be emitted from a light emitting diode such that an ultraviolet ray having a emission wavelength peak of 350 nm to 420 nm is emitted, and the maximum illumination intensity at the surface of the recording medium is from 10 to 2,000 mW/cm$^2$. The ink composition of the invention can be cured at high sensitivity even when a lower exposure amount of light, such as a light from a light-emitting diode, is used.

In the inkjet recording method of the invention, since the ink composition of the invention is used, and is cured by irradiation of an active radiation, an image having excellent rub resistance, a surface of the image having a reduced sticky texture may be formed. The irradiation with active radiation may be carried out at one time after all of the ink compositions having different colors from each other are ejected, but light exposure is preferably performed with respect to each color after the ink composition is ejected, from the viewpoint of promoting curing.

In the printed matter of the invention, an image is formed with the ink composition of the invention by the inkjet recording method (inkjet recording method of the invention). This allows the printed matter to have an image having excellent rub resistance and a reduced stickiness on the surface of the image.

The ink composition of the invention is favorably applied to an image formation of common printed matters as described above. In addition, the ink composition can be preferably used also in an embodiment in which a processing (manufacturing) is performed after forming an image on a recording medium, such as a support.

The molded article of printed matter of the invention is obtained by molding and processing the printed matter of the invention and is manufactured by the method of manufacturing a molded article of printed matter of the invention including a process of ejecting the active radiation polymerizable ink composition for inkjet recording of the invention described above onto a recording medium by ink jetting and forming an image, a process of irradiating the obtained image with active radiation to cure the ink composition to thereby obtain a printed matter having the cured image on the recording medium, and a process of molding and processing the printed matter, thereby obtaining a molded article of printed matter.

As the recording medium used in manufacturing the molded article of printed matter, a recording medium containing a moldable resin material is used. Examples include PET, polycarbonate, and polystyrene.

In these days, printed matter to which molding (forming) processing has been subjected, such as decorative sheets, are used in various applications. For example, a membrane switch surface sheet used for electrical appliance or the like is obtained in such a manner that an image is formed on a thin plastic sheet (for example, a PET, polycarbonate, or polystyrene sheet having a film thickness of about 100 μm), and then the sheet is subjected to embossing in order to impart a suitable click texture to a switch portion (click portion). Moreover, there are many cases where printed matter on which an image has been formed is subjected to embossing, in order to finish a mat-style-printed matter, or to impart three-dimensional texture to the printed matter, or the like.

Moreover, in widely-distributed automatic vending machines of beverages such as drinking water, tea, or juice, dummies of the actually sold products are displayed. The dummies are produced in such a manner that a flat support obtained by subjecting a transparent thermoplastic resin sheet to decorative printing (i.e., an image is formed) is subjected to deep-draw processing so as to obtain a half in lengthwise of a full-scale beverage case, whereby a formed product (in some cases, with deep-draw molding of 25 mm or more) is produced, which has a configuration enabling strong appeal of the product image thereof when irradiated by light from the back thereof.

As a processing method for manufacturing a deep drawing molded article of the decorated thermoplastic resin sheets, vacuum molding, pressure molding, or vacuum pressure molding is most preferable. The vacuum molding theoretically includes preheating a flat support to a temperature at which the support can be thermally transformed in advance, drawing the same into a die by a vacuum, attaching the same to the die by press while stretching, and then cooling the same. The pressure molding includes pressing the support from the side opposite to the die, attaching the same to the die by pressurizing, and then cooling the same. In the vacuum pressure molding, the vacuum and the pressure are simultaneously performed.

The ink used for the printed matter which has been subjected to the processing is demanded to have properties such that cracking, releasing or the like of the obtained image (printed matter) hardly occurs, and that the cured film has excellent impact resistance, excellent flexibility, and excellent adhesiveness with a base material. In this regard, when using a ink composition of the invention, the surface of a film may be efficiently cured since the ink composition of the invention includes a specific compound, so that excellent impact resistance may be attained. Furthermore, the surface hardness (i.e., non-sticky film with a high viscoelasticity) may be attained even when the bulk is formed from a flexible film (i.e., a soft film with a low viscoelasticity), so that particularly preferable effects can be exhibited when the ink composition is used in an application in which the above processing is carried out after image formation.

Among these processing methods described above, the ink composition is preferably used for vacuum molding (forming) in particular.

EXAMPLES

Hereinbelow, the present invention is more specifically described by referring to Examples; however, the present invention is not limited to these examples unless deviated from the gist of the invention. Hereinbelow, "%" and "part(s)" are each on the mass basis unless otherwise noted.

Preparation of Pigment Dispersion

Pigment dispersions Y1, M1, C1, and K1) were prepared by mixing the following pigment, dispersant, and solvent described below.

Yellow Pigment Dispersion (Y1)

| | |
|---|---|
| Pigment: C.I. pigment yellow 12 | 10 parts |
| Dispersant: High molecular weight dispersant [SOLSPERSE 32000, trade name, manufactured by Zeneca] | 5 parts |
| Solvent: Phenoxyethylacrylate | 85 parts |

Magenta Pigment Dispersion (M1)

| | |
|---|---|
| Pigment: C.I. pigment red 57:1 | 15 parts |
| Dispersant: High molecular weight dispersant [SOLSPERSE 32000, trade name, manufactured by Zeneca] | 5 parts |
| Solvent: Phenoxyethylacrylate | 80 parts |

Cyan Pigment Dispersion (C1)

| | |
|---|---|
| Pigment: C.I. pigment blue 15:3 | 20 parts |
| Dispersant: High molecular weight dispersant [SOLSPERSE 32000, trade name, manufactured by Zeneca] | 5 parts |
| Solvent: Phenoxyethylacrylate | 75 parts |

Black Pigment Dispersion (K1)

| | |
|---|---|
| Pigment: C.I. pigment black 7 | 20 parts |
| Dispersant: High molecular weight dispersant [SOLSPERSE 32000, trade name, manufactured by Zeneca] | 5 parts |
| Solvent: Phenoxyethylacrylate | 75 parts |

Preparation of Ink Composition

Examples 1 to 6, Examples 9 to 14, and Comparative Examples 1 to 3

The ingredients shown below were mixed, thereby preparing ink compositions of Examples 1 to 6, Examples 9 to 14, and Comparative Examples 1 to 3 shown in Table 1.

| | |
|---|---|
| 2-(2-ethoxyethoxy)ethyl acrylate (polymerizable compound C) [Radically polymerizable compound, monofunctional monomer] | 20.0 parts |
| Caprolactone-modified tetrahydrofurfuryl acrylate (polymerizable compound C) [Radically polymerizable compound, monofunctional monomer] | 30.0 parts |
| n-vinyl caprolactam [Radically polymerizable compound, monofunctional monomer] | 30.0 parts |
| Rapi-Cure DVE-3 [trade name, manufactured by ISP Europe, vinyl ether, polyfunctional monomer] | 1.0 part |
| SOLSPERSE 32000 [trade name, manufactured by Noveon; dispersant] | 0.4 parts |
| GENORAD 16 [trade name, manufactured by Rahn; stabilizer] | 0.05 parts |

| | |
|---|---|
| LUCIRIN TPO [trade name, manufactured by BASF A.G., photopolymerization initiator] | 6.0 parts |
| Dihydroxybenzophenone [photopolymerization initiator] | 4.0 parts |
| KARENZ MT-PE1 [trade name, chain transfer agent] | 2.0 parts |
| Byk 307 [trade name, manufactured by BYK Chemie; antifoaming agent] | 0.05 parts |
| Polymer [compound shown in Table 1] | 2.9 parts (0 part in Comparative Example 1) |
| Pigment dispersion (Y1, M1, C1, or K1 shown in Table 1) | 13.6 parts |

Example 7

The ingredients shown below were mixed, thereby preparing an ink composition of Example 7 shown in Table 1.

| | |
|---|---|
| 2-(2-ethoxyethoxy) ethyl acrylate (polymerizable compound C) [Radically polymerizable compound, monofunctional monomer] | 20.0 parts |
| Tricyclodecanedimethanol acrylate (polymerizable compound C) [Radically polymerizable compound, polyfunctional monomer] | 2.8 parts 30 parts |
| n-Vinyl caprolactam [Cationically polymerizable compound, monofunctional monomer] | 27.2 parts |
| Rapi-Cure DVE-3 [trade name, manufactured by ISP Europe, vinyl ether, multifunctional monomer] | 1.0 part |
| SOLSPERSE 32000 [trade name, manufactured by Zeneca; dispersant] | 0.4 parts |
| CINQUASIA MAZENTA RT-355D [trade name, manufactured by Ciba Specialty Chemicals, Inc.; pigment] | 3.6 parts |
| GENORAD 16 [trade name, manufactured by Rahn; stabilizer] | 0.05 parts |
| LUCIRIN TPO [trade name, manufactured by BASF A.G., photopolymerization initiator] | 6.0 parts |
| Dihydroxybenzophenone [photopolymerization initiator] | 4.0 parts |
| KARENZ MT-PE1 [trade name, chain transfer agent] | 2.0 parts |
| Byk 307 [trade name, manufactured by BYK Chemie; antifoaming agent] | 0.05 part |
| Polymer [Exemplified compound a-1, specific polymer A] | 2.9 parts |
| Pigment dispersion C1 | 13.6 parts |

Example 8

The ingredients shown below were mixed, thereby preparing an ink composition of Example 8 shown in Table 1.

| | |
|---|---|
| 2-(2-ethoxyethoxy)ethyl acrylate (polymerizable compound C) [Radically polymerizable compound, monofunctional monomer] | 20.0 parts |
| Tricyclodecanedimethanol acrylate (polymerizable compound C) [Radically polymerizable compound, polyfunctional monomer] | 1.5 parts |
| n-vinyl caprolactam [Radically polymerizable compound, monofunctional monomer] | 28.5 parts |
| Rapi-Cure DVE-3 [trade name, manufactured by ISP Europe, vinyl ether, multifunctional monomer] | 1.0 part |
| SOLSPERSE 32000 [trade name, manufactured by Zeneca; dispersant] | 0.4 parts |
| CINQUASIA MAZENTA RT-355D (trade name, pigment) [trade name, manufactured by Ciba Specialty Chemicals, Inc.] | 3.6 parts |
| GENORAD 16 [trade name, manufactured by Rahn; stabilizer] | 0.05 parts |
| LUCIRIN TPO [trade name, manufactured by BASF A.G., photopolymerization initiator] | 6.0 parts |
| Dihydroxybenzophenone [photopolymerization initiator] | 4.0 parts |
| KARENZ MT-PE1 [trade name, chain transfer agent] | 2.0 parts |
| Polymer [Exemplified compound a-1, specific polymer A] | 2.9 parts |
| Pigment dispersion C1 | 13.6 parts |

Details of comparative compound 1 and comparative compound 2 shown in the column of "Polymer" of Table 1 are as follows. The weight average molecular weight of each of the comparative compound 1 and the comparative compound 2 was shown in Table 1.

Comparative compound 1

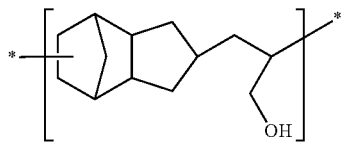

Comparative compound 2

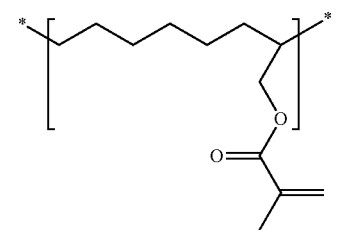

Evaluation

Inkjet Image Recording (Printing)

First, the prepared ink composition was subjected to filtration with a filter having an absolute filtration accuracy of 2 μm.

Subsequently, recording on a recording medium was carried out using a commercially-available inkjet recording apparatus equipped with a piezoelectric inkjet nozzle. The ink application system was composed of a base tank, a supply pipe, an ink-supply tank from which the ink is supplied to the inkjet head, a filter, and the piezoelectric inkjet head, and the components from the ink-supply tank to the inkjet head were insulated and heated. Thermosensors were provided at the vicinity of each of the ink-supply tank and the inkjet head nozzle, and the temperature was controlled so that the temperature at the nozzle portion was constantly at 70° C.±2° C. The piezoelectric inkjet head was driven so that multi-size dots of 8 pl to 30 pl were ejected at a resolution of 720×720 dpi. In the invention, the "dpi" indicates the numbers of dots per 2.54 cm.

After impact of the ink, ultraviolet rays were emitted (exposed) using a proximity type exposure device with a high-pressure mercury lamp (manufactured by Hitachi High Technology Electron Engineering Co., Ltd), thereby obtaining a printed matter. Specifically, ultraviolet rays were condensed (collected) in such a manner that the exposed surface illuminance was 100 mW/cm$^2$, and then an exposure system, the main scanning rate, and the ejection frequency were adjusted so that emission of ultraviolet rays was initiated in 0.1 second after the impact of the ink onto a recording medium. Moreover, exposure energy was emitted while making the exposure time variable.

In accordance with a setting of the distance between the exposure device and a medium, and the conveyance rate, the exposure energy on the medium was adjusted to the range of from 0.01 J/cm$^2$ to 15 J/cm$^2$. Exposure time of ultraviolet ray was determined as the time until the feeling of stickiness on the image surface after exposure to ultraviolet rays disappears.

Under the above conditions, the transfer sensitivity of the ink compositions, the ejection stability, the blocking sensitivity of images (cured films of the ink compositions) formed using ink, the rub resistance, and the stretching ratio were evaluated. The results are shown in Table 1. Measurement and evaluation methods of each evaluation item in Table 1 are as follows.

Measurement of Transfer Sensitivity

The exposure energy (mJ/cm$^2$) amount at the time when the feeling of stickiness disappears on the image surface after exposure to ultraviolet rays was defined as the sensitivity. The smaller numerical values indicate that the sensitivity is higher.

The acceptable range of the transfer sensitivity is 750 mJ/cm$^2$ or less and preferably 350 mJ/cm$^2$ or less in the case of radical ink.

Evaluation of Ejection Stability

In order to evaluate the ejection stability of ink in the head nozzle, evaluation was performed under the following conditions in terms of the nozzle loss number in 60 minute-continuous-ejection using a commercially-available inkjet recording device with a piezo type inkjet nozzle.

In the experiment, the nozzle loss number (the number of clogged nozzles) in a case in which the ink compositions of Examples 1 to 14 and Comparative Examples 1 to 3 were ejected onto a PET substrate under the following conditions and then exposed (exposure dose: 1000 mW/cm$^2$) was counted.

Conditions
Number of channels: 318/head
Driving frequency: 4.8 kHz/dot
Ink droplets: 7 droplets, 42 pl
Temperature: 45° C.
Evaluation Criteria
A: The nozzle loss number is from 0 to less than 5.
B: The nozzle loss number is from 5 to less than 10.
C: The nozzle loss number is 10 or more.

Evaluation of Blocking Sensitivity

On an image obtained by using the inkjet recording method as described above and then irradiating ultraviolet thereto, 500 sheets of PET (size: length and width thereof were the same as those of the flexible polyvinyl chloride sheet on which the image was formed; weight: 2 g/sheet) were stacked. The stacked sheets were left for 1 day, and then the ink transfer to the PET was visually observed. "A" denotes the case in which substantially no transfer is observed, and "Z" denotes the case in which transfer substantially occurs. The blocking sensitivity was defined by the exposure energy (mJ/cm$^2$) required until no transfer was observed.

An acceptable range of the blocking sensitivity is 12,000 mJ/cm$^2$ or less, and more preferably 6,000 mJ/cm$^2$ or less.

Evaluation of Rub Resistance

A printed side (on the cured film of the ink composition) of a flexible vinyl chloride sheet (recording medium) was rubbed with an eraser (K-50 PLASTIC ERASER KEEP, trade name, manufactured by Hoshiya), and then the transfer to the eraser was evaluated. The evaluation criteria are as follows.
Evaluation Criteria
A: Substantially no transfer is occurred.
Z: Transfer is substantially occurred.

Evaluation of Surface Hardness—Scratch Test (Pencil Method) Examination)

The print image (cured film of the ink composition) was subjected to a pencil hardness test according to JIS K5600. In radical ink having stretching properties, an acceptable range of the hardness is HB or more, and preferably H or more.

Evaluation of Degree of Stretching

Printed matters for evaluation of degree of stretching were obtained in the same manner as in the production of the printed materials of Examples 1 to 14 and Comparative Examples 1 to 3, except that the recording medium (flexible vinyl chloride sheet) was changed to FASSON PE (trade name, polyethylene film manufactured by Fasson: film thickness of 100 µm) and the ultraviolet ray exposure with a high-pressure mercury lamp after inkjet image recording was changed to ultraviolet ray exposure under conditions of an integral exposure amount of 12,000 mJ/cm$^2$ and the illuminance of 2,140 mW/cm$^2$.

The obtained printed matters for evaluation of degree of stretching were cut into pieces of an axial length of 5 cm×a width of 2.5 cm, and drawn at a rate of 30 cm/min using a tensile tester (manufactured by Shimadzu Corporation). Then, the degree of stretching at which the cured film was broken was measured. The state in which the piece was stretched to twice the initial length was defined as the degree of stretching of 100%. The acceptable range of the degree of stretching is 200% or more and is preferably 300% or more.

Vacuum Molding Evaluation

The printed matters for evaluation of degree of stretching were molded and processed by the following method. Then, the obtained molded articles of printed matter were observed, and the processing suitability was evaluated.

Vacuum molding was performed using the printed matters for evaluation of degree of stretching and using a vacuum molding device FORMING 300X 8 (trade name, manufactured by Seikosangyo Co., Ltd.). The wooden pattern illustrated in FIG. 1 was placed at the center of a vacuum table of the vacuum molding device, and the temperature of a heater was set so that the temperature of a recording medium that functions as a support was 90° C. After the temperature of the recording medium was increased to 90° C., the vacuum table on which the wooden pattern was placed was slowly raised while operating with a lifting table lever, thereby performing vacuum molding. The molded printed matters were visually observed whether or not cracks or white spots were generated, and then was evaluated based on the following evaluation criteria.
Evaluation Criteria
A: None of cracks and none of white spots are observed.
Z: Vacuum molding can not be carried out because the surface of printed matter is remarkably sticky.

TABLE 1

|  |  | Polymer | | Mono- | | | | | | | | |
|---|---|---|---|---|---|---|---|---|---|---|---|---|
|  |  | Type | Molecular weight | functional monomer ratio | Pigment dispersion | Transfer sensitivity | Ejection stability | Blocking sensitivity | Rub resistance | Surface hardness | Degree of stretching | Vacuum molding |
| Examples | 1 | a-1 | 900 | 98.6 | C1 | 1600 | A | 3000 | A | H | 240 | A |
|  | 2 | a-2 | 1000 | 98.6 | C1 | 1600 | A | 3000 | A | H | 250 | A |
|  | 3 | a-7 | 1200 | 98.6 | M1 | 1600 | A | 3000 | A | H | 250 | A |

TABLE 1-continued

|  |  | Polymer | | Mono- | | | | | | | | |
|---|---|---|---|---|---|---|---|---|---|---|---|---|
|  |  | Type | Molecular weight | functional monomer ratio | Pigment dispersion | Transfer sensitivity | Ejection stability | Blocking sensitivity | Rub resistance | Surface hardness | Degree of stretching | Vacuum molding |
|  | 4 | a-8 | 800 | 98.6 | M1 | 1600 | A | 3000 | A | H | 250 | A |
|  | 5 | a-9 | 3000 | 98.6 | Y1 | 1600 | A | 3000 | A | H | 250 | A |
|  | 6 | a-11 | 2600 | 98.6 | Y1 | 1600 | A | 3000 | A | H | 250 | A |
|  | 7 | a-1 | 900 | 93.0 | C1 | 1600 | A | 3000 | A | H | 180 | A |
|  | 8 | a-1 | 900 | 95.0 | C1 | 1600 | A | 3000 | A | H | 200 | A |
|  | 9 | a-16 | 250 | 98.6 | K1 | 1600 | A | 6000 | A | HB | 250 | A |
|  | 10 | a-16 | 350 | 98.6 | K1 | 1600 | A | 4500 | A | H | 250 | A |
|  | 11 | a-16 | 5000 | 98.6 | K1 | 1600 | A | 3000 | A | H | 180 | A |
|  | 12 | a-4 | 700 | 98.6 | K1 | 1600 | A | 3000 | A | H | 250 | A |
|  | 13 | a-13 | 1000 | 98.6 | K1 | 1600 | A | 3000 | A | H | 250 | A |
|  | 14 | a-14 | 1000 | 98.6 | K1 | 1600 | A | 3000 | A | H | 250 | A |
| Comp. Ex. | 1 | None | — | 100 | C1 | 2500 | A | 30000 | Z | 2B | 280 | Z |
| Comp. Ex. | 2 | Comparative compound 1 | 1200 | 100 | C1 | 2500 | A | 20000 | Z | B | 280 | Z |
| Comp. Ex. | 3 | Comparative compound 2 | 800 | 100 | C1 | 2500 | A | 20000 | Z | B | 250 | Z |

In Table 1, polymers a-1 to a-16 shown in the column of "Polymer" are identical to the Exemplified Compounds a-1 to a-16 described in this specification. The column of "Monofunctional monomer ratio" represents the ratio [% by mass] of the monofunctional monomer based on a total amount of the polymerizable compound C in each ink composition. The unit of the numerical values of the column of "Transfer sensitivity" is [mJ/cm$^2$], the unit of the numerical values of the column of "Blocking sensitivity" is [mJ/cm$^2$], and the unit of the numerical values of the column of "Degree of stretching" is [%]. The term "Comp. Ex." stands for Comparative Example.

From Table 1, it is seen that the ink compositions of the Examples according to the invention are excellent in ejection stability of the ink compositions; and have much better properties in terms of transfer sensitivity, blocking sensitivity, rub resistance, and vacuum molding, as compared to the ink compositions of the Comparative Examples; and cured films having a high surface hardness can be obtained by the ink compositions of the Examples according to the invention.

All publications, patent applications, and technical standards mentioned in this specification were herein incorporated by reference to the same extent as if each individual publication, patent application, or technical standard was specifically and individually indicated to be incorporated by reference.

What is claimed is:

1. An active radiation curable ink composition for inkjet recording, the active radiation curable ink composition comprising: (A) a polymer comprising a repeating unit having a radically polymerizable group structure at a site forming part of a main chain thereof, wherein the repeating unit having a radically polymerizable group of the (A) polymer is a repeating unit selected from the group consisting of the following a-1 to a-16:

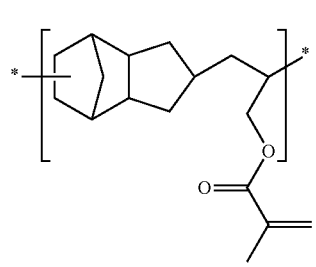

a-1

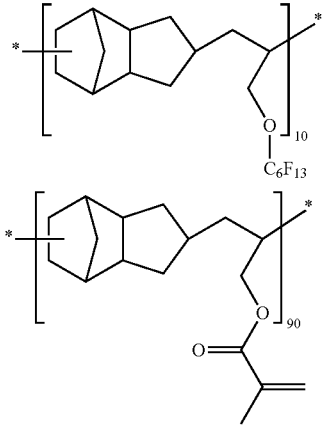

a-2

-continued

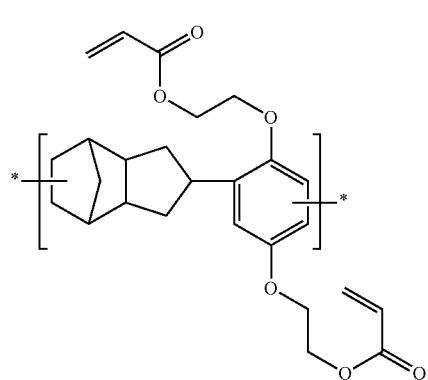

a-3

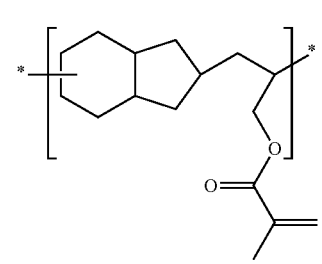

a-4 a-5
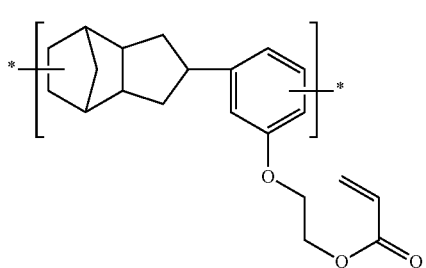
a-6
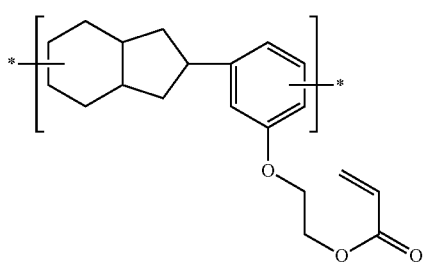
a-7
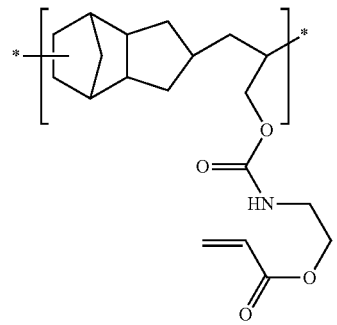
a-8
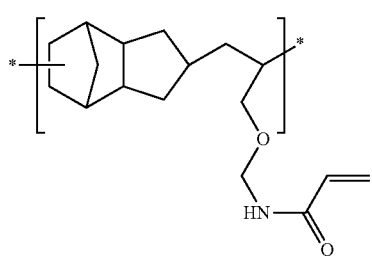
a-9
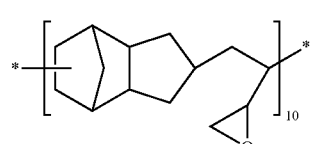
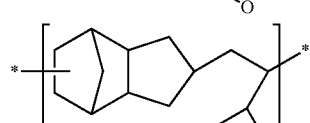
a-10
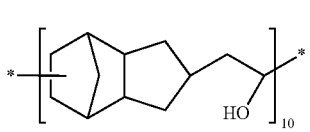
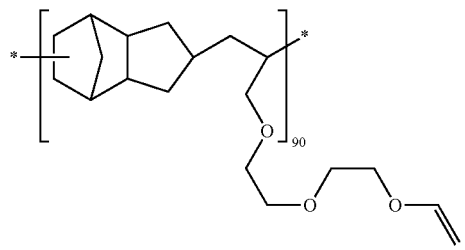
a-11
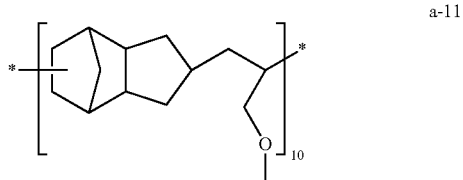
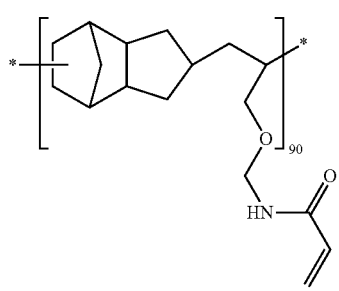
a-12
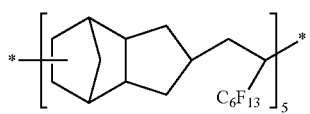
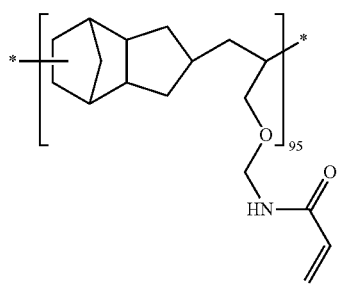
a-13
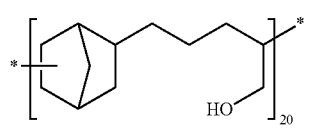
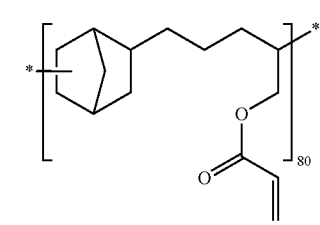

-continued a-14
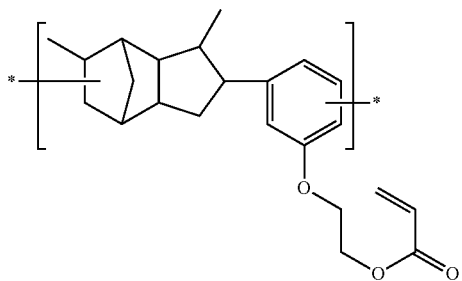

a-15
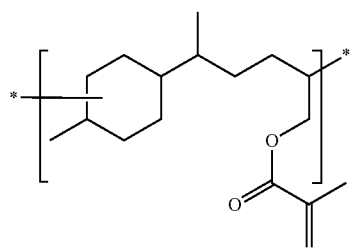

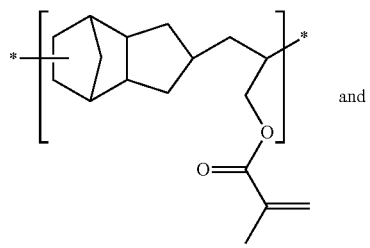

and a-16
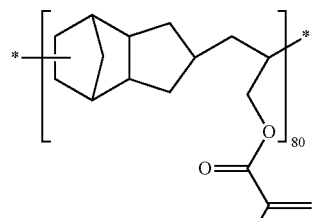

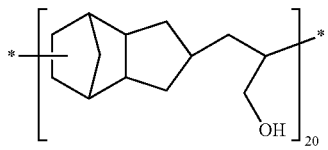

(B) a photopolymerization initiator; and (C) a radically polymerizable compound having a structure different from that of the (A) polymer, wherein
a viscosity of the active radiation curable ink composition at 25° C. to 30° C. is from 35 mPa·s to 500 mPa·s.

2. The active radiation curable ink composition for inkjet recording according to claim 1, wherein the radically polymerizable group is included in a side chain of the (A) polymer.

3. The active radiation curable ink composition for inkjet recording according to claim 1, wherein the radically polymerizable group is selected from the group consisting of an acrylic acid ester group, a methacrylic acid ester group, an acryl amide group, a methacrylamide group, an itaconic acid ester group, a crotonic acid ester group, an isocrotonic acid ester group, a maleic acid ester group, a styrene group, a vinyl ether group, an allyl group, and an N-vinyl group.

4. The active radiation curable ink composition for inkjet recording according to claim 1, wherein a ratio of monofunctional monomers in the (C) polymerizable compound is 95% by mass or more based on a total amount of the (C) polymerizable compound.

5. A method of manufacturing printed matter, the method comprising:
ejecting the active radiation curable ink composition for inkjet recording according to claim 4 onto a recording medium by ink-jetting, thereby forming an image; and
irradiating the formed image with active radiation to cure the active radiation curable ink composition, thereby obtaining printed matter having a cured image on the recording medium.

6. A method of manufacturing printed matter, the method comprising:
ejecting the active radiation curable ink composition for inkjet recording according to claim 1 onto a recording medium by ink-jetting, thereby forming an image; and
irradiating the formed image with active radiation to cure the active radiation curable ink composition, thereby obtaining printed matter having a cured image on the recording medium.

7. Printed matter manufactured by the method of manufacturing printed matter according to claim 6.

8. A method of manufacturing a molded article of printed matter, the method comprising:
molding and processing the printed matter according to claim 7, thereby obtaining a molded article of printed matter.

9. A molded article of printed matter manufactured by the method of manufacturing a molded article of printed matter according to claim 8.

* * * * *